Patented Aug. 1, 1950

2,516,931

UNITED STATES PATENT OFFICE 2,516,931

DIAZOTYPE LAYERS CONTAINING RESORCINOL MONO-ETHERS

William H. von Glahn, Loudonville, and Lester N. Stanley, Delmar, N. Y., assignors to General Aniline & Film Corporation, New York, N. Y., a corporation of Delaware No Drawing. Application August 7, 1946, Serial No. 688,962

8 Claims. (Cl. 95—6)

This invention relates to a diazotype process and more particularly to the use of certain azo components in the light-sensitive layer or as developers for the diazotype image.

In the reproduction of mechanical drawings, printed material, pictures or other originals to be copied, it is of particular advantage in any case to first make an intermediate print or transition print on a transparent or semi-transparent diazo copying material and use this intermediate or transition print as an original for the reproduction of further copies. The intermediate print is obtained by exposing a transparent or semi-transparent sensitized diazotype material to actinic rays by either the printing-through or reflex process and then developing the exposed diazotype material either by contact with gaseous ammonia as in the case of a two-component diazotype or by treatment with an alkaline solution of the coupling component as in the case of the one-component or so-called wet development diazotype process. The use of intermediate or transition prints as originals in the reproduction of further copies is of particular value when it is desired to make a large number of reproductions from a frail or valuable original which would be adversely affected, if not destroyed, in the repeated exposures necessary to make the desired number of copies. It is not only useful but necessary to make such a transition print when an original to be copied is opaque and can only be copied on a diazotype layer by reflex exposure.

The efficiency of transition prints depends upon the covering power or opacity to ultraviolet light of the azo dye image produced and the transparency of the background areas. The latter property, in turn, depends upon the stability in the case of two-component coatings against premature coupling of the diazo and azo component. To a lesser but nevertheless considerable degree, the efficiency of transition prints also depends upon the visual density of the image produced since images of poor visual density such as a yellow image on a white or transparent background, which may satisfy the requirements of opacity to ultraviolet light and transparency of the background, nevertheless have the disadvantage of rendering difficult the detection of flaws in the intermediate image and it is often necessary to make a test print from the transition print of deeper contrast than the transition print before such flaws can be detected.

Many types of azo dyestuff coupling components are known to the diazotype art for the production of prints of a deep color which have good visual density. Most common of such azo components is phloroglucin. However, despite the density of the color reproducing the image, when using such azo components the actinic opacity or photographic density is not sufficient to reproduce the image satisfactorily in subsequent diazotype copies.

Resorcinol has been suggested and has been extensively used in the production of diazotype light-sensitive layers for transition prints and it has been found that resorcinol will produce sepia and brown color images having the desired light absorption characteristics for transition printing. While resorcinol will produce the image on the transition print in azo dye colors having good opacity to ultraviolet light and having sufficient visual density to assure detection of printing flaws, nevertheless the precoupling stability of diazotype layers containing resorcinol is not sufficient to assure prolonged storage before use. Carriers such as transparentized paper or film having thereon a light-sensitive layer composed of the usual diazo compounds and additional components with resorcinol as the coupling component gradually develop discoloration prior to use, which discoloration is produced by spontaneous coupling of the resorcinol and diazo compound. This discoloration will, of course, be retained by the transition print and will be present in background areas as well as in the image areas, thus impairing the ability of the background areas to efficiently transmit actinic light. Consequently the light-sensitive diazo compounds or other light-sensitive media in the reproduction material employed for making further copies from the transition print will not be efficiently decomposed in the background areas. The discoloration appearing in the background area of the transition print will therefore be reproduced in the final copies, diminishing the contrast between the background and the image in such final copies.

It has now been found that a new class of azo coupling components not heretofore used in a diazotype reproduction medium may be employed as the developer for such medium, as for instance, by incorporating the new coupling component in the light-sensitive layer of a diazotype with a suitable diazo compound. As carriers for the light-sensitive layer any of the usual carriers employed in diazotype work, such as paper, film, glass, wood, and fabric may be employed, however, for transition prints we prefer to use transparentized paper or film, such as cellulose acetate film. The diazotype media thus produced will produce the image in a sepia color of high actinic capacity and good visual density while at the same time providing a two-component diazotype light-sensitive layer which has a high degree of stability against precoupling. If desired, the image can be reproduced with the same high degree of actinic capacity and good visual density by omitting the azo component from the light-sensitive layer in accordance with the one-component diazotype practice and developing the exposed image by application of an alkaline solution containing the new azo components. The class of azo coupling components contemplated by this invention may be described as monoethers of resorcinol and can be conveniently represented by the following general formula:

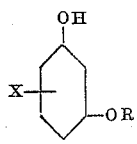

in which R is a radical of the group consisting of alkyl, such as methyl, ethyl, propyl, isopropyl, butyl, isobutyl, allyl, isopropenyl, n-isobutenyl; hydroxyalkyl such as β-hydroxyethyl and β-hydroxypropyl; alkoxyalkyl such as methoxymethyl and ethoxyethyl; halogenoalkyl such as β-chloroethyl and β-bromoethyl, β-(β-chloroethoxy)-ethyl; carboxyalkyl such as carboxymethyl; carboalkoxyalkyl such as carbomethoxymethyl; aryl such as phenyl and naphthyl; arylalkyl such as benzyl, p-methoxybenzyl, p-methylbenzyl, p-chlorobenzyl and o-chlorobenzyl; aminoalkyl such as aminoethyl; and sulfoalkyl such as sulfoethyl radicals; and wherein X indicates that the nucleus may be substituted further by any of the usual substituents excepting those which would adversely affect the coupling capacity. (Substituent groups adversely affecting coupling are $NO_2$, $NH_2$ and $SO_3H$.) Examples of suitable substituents which may be given as values for X include hydrogen, alkyl such as methyl, ethyl, propyl, isopropyl, butyl, isobutenyl, isopropenyl and isobutenyl; halogen; carboxy; alkoxy such as methoxy and ethoxy; hydroxyalkyl such as hydroxy ethyl and hydroxypropyl; aryl such as phenyl and naphthyl; alkaryl; aralkyl such as benzyl; carboalkoxy; carbamido; the radical

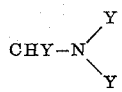

wherein the Y's, which are the same or different, are selected from the group consisting of hydrogen, alkyl, hydroxyalkyl, aryl, alkaryl, aralkyl and cycloalkyl, and may be joined to complete a heterocyclic ring. Examples of monoethers of resorcinol of this class are resorcinol monoethyl ether, resorcinol-o-acetic acid, resorcinol mono-β-sulfoethyl ether, mono-β-hydroxyethyl ether of resorcinol, resorcinol mono-(4'-sulfophenyl)-ether, resorcinol-monoaminoethyl ether, morpholinomethylresorcinol monomethyl ether, N-diethylaminomethyl resorcinol monomethyl ether, N-diethylaminoethyl ester of carboxymethyl ether of resorcinol, methyl ester of carboxymethyl ether of N-dimethylaminomethyl resorcinol, carboxymethyl ether of bromoresorcinol.

In the preparation of the preferred diazotype two-component layers intended for use as intermediate or transition print media, a suitable transparent base such as transparentized paper, cellulose acetate film, or other transparent material, is coated by means known to the art with a light-sensitive composition containing suitable diazo compounds and the new coupling components in combination with organic acids, thiourea, phosphoric acid, isopropanol and such other materials as are ordinarily used in the preparation of diazotype two-component light-sensitive coating compositions for the sensitization of such transparent bases. As diazo compounds, it is generally preferred to use those which are derived from p-diamines of the benzene series, particularly those in which one of the amino groups is substituted by such groups as alkyl, alkoxy alkyl, aryl, aralkyl, alkylol, cycloaliphatic, and heterocyclic groups. However, other diazo compounds are suitable and may be used. Among these are the diazo anhydrides of aminohydroxynaphthalene compounds.

The diazo compounds may be used as the free diazonium chloride or in the form of a stabilized salt such as the $ZnCl_2$, $CdCl_2$, or $SnCl_4$ double salts, the fluoro borate, the acid sulfate, or the aryl or alkyl sulfonate of the diazonium compound. Examples of such diazo compounds are those derived from: N-hydroxyethyl-N-methylamino p-amino benzene; N-ethyl-N-hydroxyethylamino p-amino benzene; p-amino diphenylamine; 1 - monoethylamino-2-(or-3-)methyl-4-amino benzene; 1-dimethyl-2-(or-3-)methyl-4-amino benzene; 1 - diethylamino - 3 - ethoxy-4-amino benzene; 1 - diethylamino-2-methoxy-4-amino benzene; 1-benzoylamino-2,5-diethoxy (or dimethoxy)-4-amino benzene; p-amino-N-diethyl aniline; p-amino-N-dimethyl aniline; 1-N,N-dihydroxyethylamino-3-chloro-4-amino benzene; p-amino-N - ethyl - N - benzylaniline; p-amino-N-ethyl-N - 2',6' - dichlorobenzylaniline; p-amino-N-ethylaniline; p-phenylene diamine; p-amino-N,N-dihydroxyethylaniline; 4' - ethoxyphenyl-2,5-diethoxyaniline; 1 - (2',6' - dichlorobenzyl)-2-phenoxy-4-amino benzene; 1-benzoylamino-2-methoxy-5-methyl-4-amino benzene; 1-N-ethyl-N-propylamino-2-ethoxy-4 - amino benzene; 1 - N - ethyl-N-butyl-2-methoxy-4-amino benzene; p-morpholinoaniline; 4 - chloro - 6-hydroxyaniline-2-sulfonic acid; 2 - amino - 1-hydroxynaphthalene-5-sulfonic acid.

The following specific examples will serve further to illustrate this invention, it being understood, however, that they are not intended to limit its scope. Unless otherwise stated, the parts are by weight.

*Example 1*

A transparentized paper is coated with a coating solution containing the following materials per 100 cc. of water:

3.0 grams resorcinol monoethyl ether
3.6 grams N-ethyl-o-toluidine - p - diazo - $ZnCl_2$ double salt
8.0 grams citric acid
1.0 cc. phosphoric acid
4.0 grams thiourea
5.0 cc. isopropanol The coated transparency is first dried in the usual manner and samples are then submitted to accelerated aging tests and others stored for a prolonged period under average storage conditions of temperature and moisture. Under both these tests, the coatings proved to be more stable to precoupling than in the case of similar coatings made with resorcinol as the coupling component. Upon exposure to light under an original pattern and development by contact with ammonia fumes in the usual manner, the coated transparency reproduces the image of the original in a dark sepia color. This dark sepia azo dye image has excellent properties of opacity to ultraviolet light and upon subsequent exposure and development of an ordinary diazotype reproduction medium using the print of this example as an original, excellent reproductions may be obtained in any desired color having clear backgrounds. Upon substitution of 4 grams of N-methyl-N-hydroxyethylaniline-p-diazo $ZnCl_2$ double salt for the diazo salt of this example, light-sensitive coatings having the same properties are obtained.

*Example 2*

A transparentized paper is coated with a solution containing the following materials per 100 cc. of water:

3.5 grams resorcinol-o-acetic acid
4.0 grams N-ethyl-N-hydroxyethyl aniline p-diazo $ZnCl_2$ double salt
8.0 grams citric acid
1.0 cc. phosphoric acid
4.0 grams thiourea
5.0 cc. isopropanol The coated transparency is first dried in the usual manner. Samples are then submitted to accelerated aging tests and also stored for a prolonged period of time under average storage conditions of temperature and moisture. Under both of these tests, the coatings proved to be more stable to precoupling than in the case of similar coatings made with resorcinol as the coupling component. Upon exposure to light under an original pattern and development by contact with ammonia fumes in the usual manner, the transparency coated in accordance with the formula of this example reproduces the image of an original pattern in a deep yellow brown color. This color image has excellent opacity to ultraviolet light and upon subsequent exposure and development of an ordinary diazotype reproduction medium using the print of this example as an original, excellent reproductions are obtained in any desired color. Due to the fact that there has been no substantial precoupling in the transition print used as an original in this step, the final reproductions will have clear backgrounds unimpaired by any discoloration due to incomplete light-decomposition of the diazo in the second diazotype layer. The intermediate or transparency images produced from the formula of this example are also fast to light and wetting.

Upon substitution of 3.6 grams of N-ethylaniline-p-diazo $CdCl_2$ double salt for the diazo salt of this example, light-sensitive coatings which will reproduce the image in a deeper brown color than that of this example are obtained. These reproductions will also have the same properties of outstanding opacity to ultraviolet light, light fastness and fastness to wetting as the reproductions of this example and the coatings will be stable to precoupling.

*Example 3*

Transparentized paper is coated with a coating solution containing the following materials per 100 cc. of water:

4.1 grams resorcinol mono-β-sulfoethyl ether
3.5 grams 2-amino-1-hydroxy-5-naphthalene sulfonic acid diazo anhydride
8.0 grams citric acid
1.0 cc. of phosphoric acid
4.0 grams thiourea
5.0 cc. isopropanol The resulting coated paper is exposed to light under a pattern and then developed by ammonia fumes in the usual manner to a dark sepia azo dye image on a white background. The azo dye areas have outstanding opacity to ultraviolet light and excellent wetting properties and are therefore very useful for further reproduction work. Upon being submitted to accelerated aging tests and aging tests under prolonged storage, the coatings obtained in accordance with this example are found to be more stable to precoupling under such conditions than are similar coatings made with resorcinol as the coupling component. In view of this superior resistance to precoupling and in view of the opacity to ultraviolet light of the dye images formed on exposure and development, further reproductions of good contrast can be obtained from prints made in accordance with this example, which further reproductions will have clear backgrounds unimpaired by discoloration due to incomplete light-decomposition of the light-sensitive material in the second reproduction medium.

*Example 4*

Transparentized paper is coated with a coating solution containing the following materials per 100 cc. of water:

4.0 grams N-diethylaminomethylresorcinol monomethyl ether
3.6 grams 2.5.4'-triethoxy diphenyl-1-diazonium acid sulfate
8.0 grams citric acid
1.0 cc. phosphoric acid
4.0 grams thiourea
5.0 cc. isopropanol The coated transparency is first dried in the usual manner. It is then submitted to accelerated aging tests and is also stored for a prolonged period under average storage conditions of temperature and moisture. Under both of these tests the coatings proved to be more stable to precoupling than in the case of similar coatings made with resorcinol as the coupling component. Upon exposure to light under an original pattern and development by contact with ammonia fumes in the usual manner, the coated transparency reproduces the image of the pattern in a dark sepia azo dye color on a clear background. The azo dye image areas have excellent opacity to ultraviolet light and upon subsequent exposure and development of an ordinary diazotype reproduction medium, using the print of the example as an original, excellent reproductions may be obtained in any desired color having clear backgrounds unimpaired by any discoloration due to faulty light-decomposition of the diazo in the second diazotype layer. The intermediate or transition print images produced from the formula of this example are also fast to light and wetting.

*Example 5*

Transparentized paper is coated with a coating solution containing the following materials per 100 cc. of water:

3.3 grams resorcinol mono-(4'-sulfophenyl)-ether
3.5 grams N-ethyl-N-hydroxyethyl-m-toluidine p-diazonium chloride $ZnCl_2$ double salt
8.0 grams citric acid
1.0 cc. phosphoric acid
4.0 grams thiourea
5.0 cc. isopropanol The coated transparency is first dried in the usual manner. It is then submitted to accelerated aging tests and it is also stored for a prolonged period under average storage conditions of temperature and moisture. Under both these tests the coatings proved to be more stable to precoupling than in the case of similar coatings made with resorcinol as the coupling component. Upon exposure to light under an original pattern and development by contact with ammonia fumes in the usual manner, the coated transparency reproduces the image of the original pattern in a dark sepia azo dye color which has good light and wash fastness. Due to the high resistance of this coating to precoupling, the background areas will be clear. The azo dye image areas produced upon exposure and development have excellent opacity to ultraviolet light and upon subsequent exposure and development of a diazotype reproduction medium, using the print of this example as an original, excellent reproductions may be obtained in any desired color having clear backgrounds unimpaired by any discoloration due to faulty light-decomposition of the diazo in the second diazotype layer.

Example 6

Transparentized paper is coated with a coating solution containing the following materials per 100 cc. of water:

3.2 grams resorcinol mono-hydroxyethyl ether
3.6 grams N-ethyl-o-toluidine-p-diazo $ZnCl_2$ double salt
8.0 grams citric acid
1.0 cc. phosphoric acid
4.0 grams thiourea
5.0 cc. isopropanol The coated transparency is first dried in the usual manner. It is then submitted to accelerated aging tests and it is also stored for a prolonged period under average storage conditions of temperature and moisture. Under both these tests the coatings proved to be more stable to precoupling than in the case of similar coatings made with resorcinol as the coupling component. Upon exposure to light under an original pattern and development by contact with ammonia fumes in the usual manner, the coated transparency reproduces the image of the original pattern in a dark sepia azo dye color which has good light and wash fastness. Due to the high resistance of this coating to precoupling, the background areas will be clear. The azo dye image areas produced upon exposure and development have excellent opacity to ultraviolet light and upon subsequent exposure and development of a diazotype reproduction medium, using the print of this example as an original, excellent reproductions may be obtained in any desired color having clear backgrounds unimpaired by any discoloration due to faulty light-decomposition of the diazo in the second diazotype layer.

Example 7

Transparentized paper is coated with a coating solution containing the following materials per 100 cc. of water:

3.2 grams resorcinol mono-$\beta$-amino-ethyl ether
3.6 grams N-ethyl-o-toluidine-p-diazo $ZnCl_2$ double salt
8.0 grams citric acid
1.0 cc. phosphoric acid
4.0 grams thiourea
5.0 cc. isopropanol The coated transparency is first dried in the usual manner. It is then submitted to accelerated aging tests and it is also stored for a prolonged period under average storage conditions of temperature and moisture. Under both these tests the coatings proved to be more stable to precoupling than in the case of similar coatings made with resorcinol as the coupling component. Upon exposure to light under an original pattern and development by contact with ammonia fumes in the usual manner, the coated transparency reproduces the image of the original pattern in a dark sepia azo dye color which has good light and wash fastness. Due to the high resistance of this coating to precoupling, the background areas will be clear. The azo dye image areas produced upon exposure and development have excellent opacity to ultraviolet light and upon subsequent exposure and development of a diazotype reproduction medium, using the print of this example as an original, excellent reproductions may be obtained in any desired color having clear backgrounds unimpaired by any discoloration due to faulty light-decomposition of the diazo in the second diazotype layer.

Example 8

A diazotype coating solution is made up as follows:

2.3 grams $ZnCl_2$ double salt of the diazo of 4-(N-methyl-N,$\beta$-hydroxyethylamino)-aniline
3.4 grams mono-methyl ether of morpholinomethyl resorcinol
2.0 cc. isopropanol
5.0 cc. ethylene glycol
4.0 grams citric acid
4.0 grams boric acid
5.0 grams $ZnCl_2$
0.5 gram of saponin dissolved in water and diluted to 50 cc.

The resulting solution is applied to paper in the usual manner and the coated paper dried. Upon exposing the thus prepared paper to an original pattern and developing with ammonia vapors, a reproduction of the pattern is obtained in a tan brown azo dye image which has excellent opacity to ultraviolet light and better wash and light fastness properties than those obtained when resorcinol is used as a coupler in a similar coating solution.

Example 9

A diazotype coating solution is made up as follows:

2.3 grams of the $ZnCl_2$ double salt of the diazo of 4-(N-methyl-N-$\beta$-hydroxyethylamino)-aniline
3.1 grams N-diethylaminomethylresorcinol mono-ethyl ether
2.0 cc. isopropanol
5.0 cc. ethylene glycol
4.0 grams citric acid
4.0 grams boric acid
5.0 grams zinc chloride
5.0 grams thiourea
0.5 gram saponin are dissolved in water and diluted to 50 cc.

The resulting solution is applied to paper stock in the usual manner and the coated paper dried. Upon exposure to light through a pattern and development with ammonia vapor, the pattern is reproduced in a tan colored azo dye image which has good opacity to ultraviolet light and better wash fastness properties than are obtained when resorcinol is used as the coupler in a similar coating solution.

*Example 10*

A diazotype light-sensitive coating solution is made up as follows:

0.51 gram of ZnCl₂ double salt of the diazo of 4-(N-methyl-N-β-hydroxyethylamino)-aniline
0.72 gram of β-sodium sulfoethyl ether of resorcinol (prepared by heating a mixture of resorcinol, bromoethanesulfonic acid and sodium hydroxide)
0.4 cc. isopropanol
1.0 cc. ethylene glycol
0.8 gram citric acid
0.8 boric acid
1.0 gram ZnCl₂
1.0 gram thiourea
0.1 gram saponin are dissolved in water and diluted to 10 cc.

The resulting solution is applied to paper stock and the coated paper dried. Upon submitting this coated paper to aging tests, it is found to be more stable to precoupling than a coated paper obtained when using resorcinol as the coupling component. Upon exposing the paper coated in accordance with this example through an original pattern and developing with ammonia vapor in the usual manner, the pattern is reproduced in a brown azo dye image of good visual density and having excellent properties of opacity to ultraviolet light and light and wash fastness.

We claim:

1. As new products, light-sensitive layers on a suitable base containing a suitable light-sensitive diazo compound and an azo coupling component selected from the class represented by the formula:

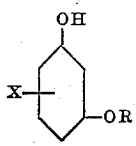

wherein R is a radical of the group consisting of alkyl, cycloalkyl, aryl, aralkyl and such radicals substituted by substituents selected from the group consisting of halogen, hydroxy, alkoxy, carboxy, carboalkoxy, carbamido, sulfo and amino, and X is a member of the group consisting of hydrogen halogen and aliphatic radicals.

2. As new products, light-sensitive layers on a suitable base comprising a diazo compound derived from a p-diamino compound of the benzene series and an azo coupling component selected from the class represented by the following formula:

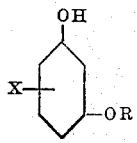

wherein R is a radical of the group consisting of alkyl, cycloalkyl, aryl, aralkyl and such radicals substituted by substituents selected from the group consisting of halogen, hydroxy, alkoxy, carboxy, carboalkoxy, carbamido, sulfo and amino, and X is a member of the group consisting of hydrogen halogen and aliphatic radicals.

3. As a new product, a light-sensitive layer on a suitable base comprising a diazo derivative of a p-diamino compound of the benzene series and resorcinol-o-acetic acid.

4. As a new product, a light-sensitive layer on a suitable base comprising a diazo derivative of a p-diamino compound of the benzene series and resorcinolmonomethyl ether.

5. As a new product, a light-sensitive layer on a suitable base comprising a diazo derivative of a p-diamino compound of the benzene series and resorcinol mono-β-sulfoethyl ether.

6. As a new product, a light-sensitive layer on a suitable base comprising as the diazo compound N-ethyl-N-hydroxyethyl aniline p-diazo ZnCl₂ double salt and as the coupling component resorcinol-o-acetic acid.

7. As a new product, a light-sensitive layer on a suitable base comprising as the diazo compound N-ethyl-o-toluidine-p-diazo ZnCl₂ double salt and as the coupling component resorcinol monomethyl ether.

8. As a new product, a light-sensitive layer on a suitable base comprising as the diazo compound 4-(N-methyl-N-β-hydroxyethylamino)benzene-p-diazonium chloride ZnCl₂ double salt and as the coupling component resorcinol mono-β-sulfoethyl ether.

WILLIAM H. von GLAHN.
LESTER N. STANLEY.

REFERENCES CITED

The following references are of record in the file of this patent:

UNITED STATES PATENTS

| Number | Name | Date |
|---|---|---|
| 2,196,950 | Zahn | Apr. 9, 1940 |
| 2,246,425 | Poser | June 17, 1941 |
| 2,432,593 | Straley | Dec. 16, 1947 |
| 2,437,868 | Glahn et al. | Mar. 16, 1948 |